(No Model.)
C. G. MORGNER.
BICYCLE LOCK.
No. 563,396.
2 Sheets—Sheet 1.
Patented July 7, 1896.
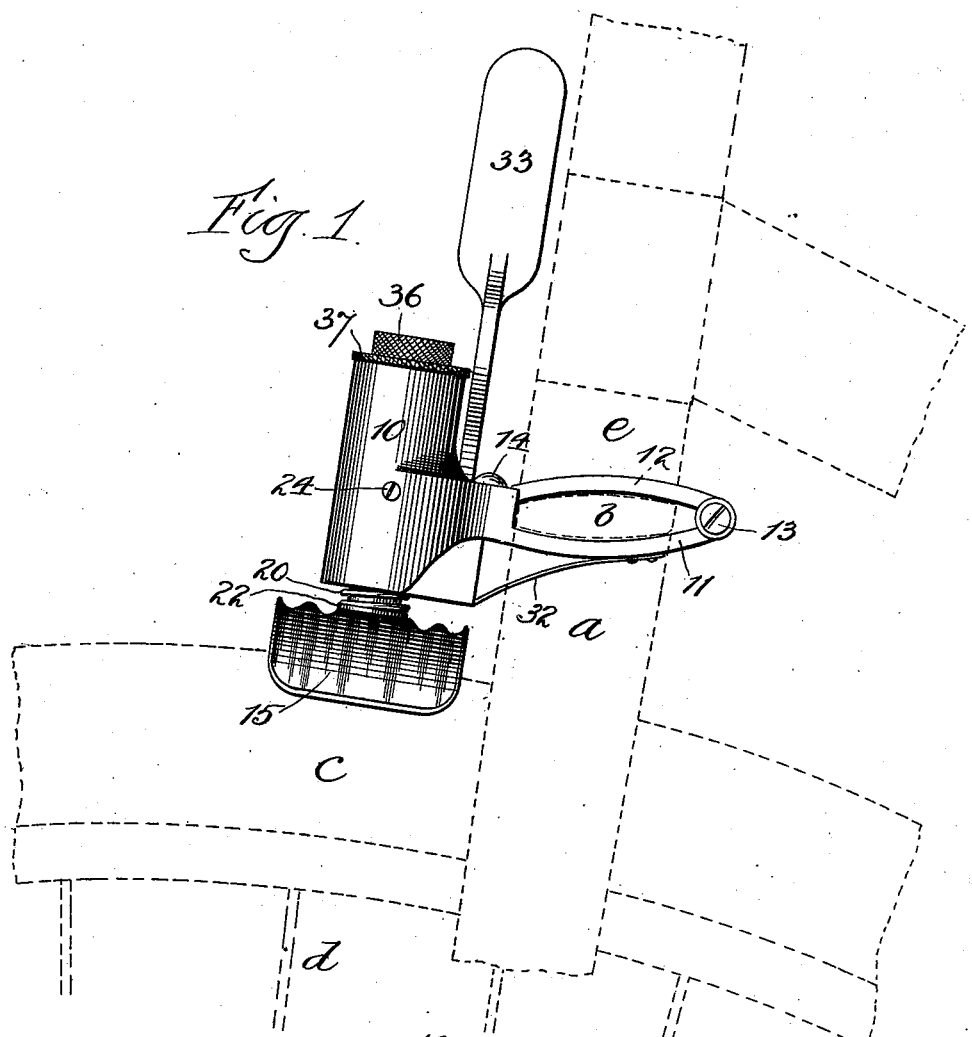
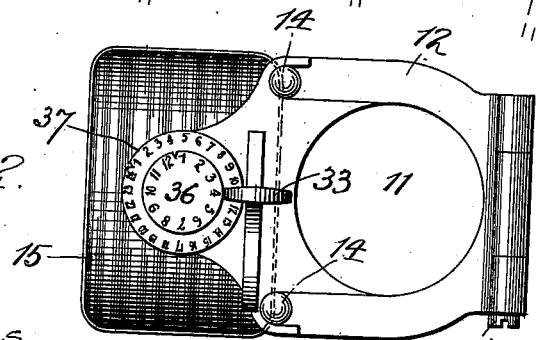
Witnesses
Inventor
Carl G. Morgner,
Attys.

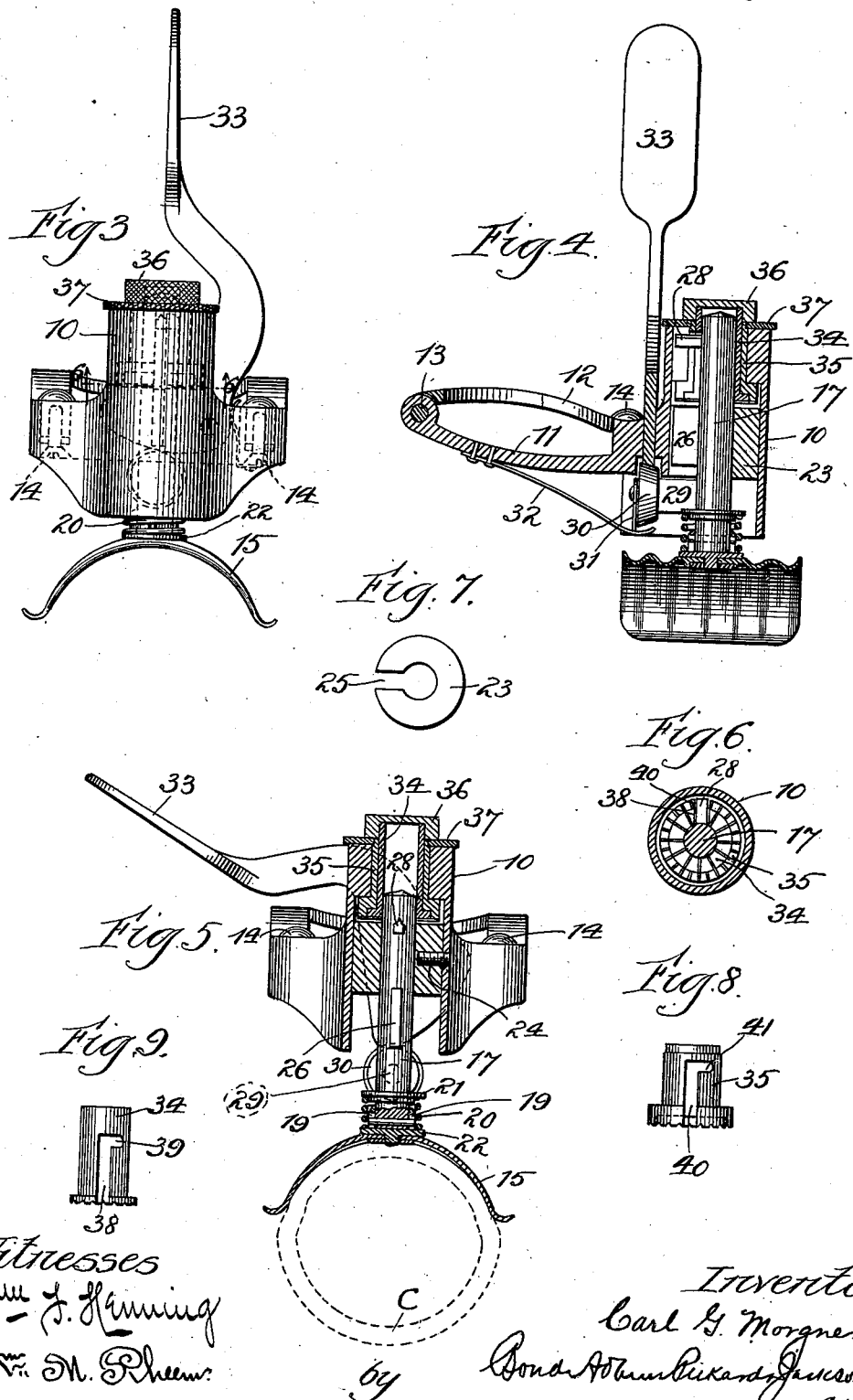

UNITED STATES PATENT OFFICE.

CARL G. MORGNER, OF CHICAGO, ILLINOIS.

BICYCLE-LOCK.

SPECIFICATION forming part of Letters Patent No. 563,396, dated July 7, 1896.

Application filed February 11, 1895. Serial No. 538,012. (No model.)

*To all whom it may concern:*

Be it known that I, CARL G. MORGNER, a citizen of the United States, residing at Chicago, in the county of Cook and State of Illinois, have invented certain new and useful Improvements in Bicycle-Locks, of which the following is a specification, reference being had to the accompanying drawings, in which—

Figure 1 is a side elevation. Fig. 2 is a plan view. Fig. 3 is an end view. Fig. 4 is a longitudinal vertical section. Fig. 5 is a vertical cross-section. Fig. 6 is a cross-section on line 6 6 of Fig. 3. Fig. 7 is a plan view of the bushing. Figs. 8 and 9 are side views of the external and internal locking-cylinders.

My invention relates to locks for bicycles and other forms of velocipedes, and has for its object to provide a new and improved lock which will always be in condition for locking the velocipede and afford a sufficient safeguard against the use of the latter when locked.

To accomplish this object, my invention consists in the features of construction and the combination or arrangement of parts hereinafter described and claimed.

In the drawings, $a$ indicates the usual fork at the front portion of a bicycle, $b$ being the horizontal portion at the upper end of said fork.

$c$ indicates a pneumatic tire carried by the wheel $d$.

The portions $a$, $b$, $c$, and $d$ are illustrated by dotted lines in Fig. 1, and serve to show the position of the lock when arranged in place upon a bicycle. It will be understood, however, that where the lock is used for other forms of velocipedes it may be otherwise arranged.

10 indicates a casing, which is provided with a central passage arranged vertically, as shown in Figs. 4 and 5. The casing 10 is adapted to contain the various parts of the lock, and is secured to the bicycle by means of arms 11 12, which form a clamp arranged to receive the horizontal portion $b$ of the bicycle-fork, as shown in Figs. 1 and 4. The arms 11 12 are pivoted together by a bolt or screw 13, and the arm 12 is bifurcated, as shown in Figs. 2 and 4, to permit of the passage of the handle-bar. The handle $e$ is indicated by dotted lines in Fig. 1. The ends of the arm 12 are secured to the arm 11 by screws 14, as shown in Figs. 2 and 3, by which means the arms 11 12 may be clamped tightly together, thereby firmly securing the lock in place.

15 indicates a brake-shoe, which is concave, as illustrated in the drawings, and is also corrugated in order to permit of securing a better engagement with the tire $c$. The shoe 15 is connected to a sleeve 16, carried by a bar 17, as shown in Fig. 4, the sleeve 16 being connected to said bar by means of a pin 18, secured in the lower end of said bar and moving in slots 19 in said sleeve. This construction provides for a slight vertical play of the sleeve on the bar 17.

A spring 20, bearing at its upper end against a washer 21, carried by the bar 17, and at its lower end against a flange 22, carried by the sleeve 16, serves to normally press the shoe 15 downward. This construction permits of sufficient play of the shoe 15 to enable it to accommodate itself to variations in the size and shape of the tire. This adjustability of the shoe is very desirable owing to the fact that the size of the tire of any particular wheel often varies owing to variations in the degree of its inflation.

The bar 17 is fitted into a bushing 23, which in turn is fitted into the casing 10, and is secured therein by a set-screw 24 or other suitable means. The bushing 23 is provided with a slot 25 at one side, in which moves a lug 26, carried by the bar 17, which serves to prevent rotary motion of the bar 17. Near its upper end the bar 17 carries a second lug or projection 28, the object of which will be hereinafter set forth.

Below the bushing 23 the bar 17 is provided with a laterally-projecting arm 29, upon which is journaled a roller 30, as shown in Fig. 4, the roller 30 preferably having a beveled periphery, as shown.

31 indicates a plate which is mounted upon the pivot of the roller 30 and projects in a vertical plane slightly below the lower portion of the roller 30, as shown in Fig. 4.

32 indicates a spring which is connected to the arm 11 and exerts a lifting pressure against the lower edge of the plate 31, the tendency of the spring 32 being to lift the plate 31 and consequently the bar 17, thereby holding the shoe 15 normally out of contact with the wheel-tire.

33 indicates a cam-lever which is pivoted to the casing 10 above the roller 30, the lower portion of said lever being adapted to bear upon the periphery of said roller, the arrangement being such that by rocking the lever 33 the roller 30 and bar 17 may be forced downward to move the shoe 15 forcibly into contact with the wheel-rim, or said roller may be released to permit of the upward movement of the bar 17 under the action of the spring 32.

For the purpose of locking the bar 17 when moved downward, as above described, locking cylinders or tumblers 34 35 are provided, the cylinder 34 being fitted within the cylinder 35 and being adapted to rotate freely therein, the cylinder 35 being fitted in the upper portion of the casing 10 above the bushing 23, and being also adapted to freely rotate. Thumb-caps 36 37 respectively are provided at the upper ends of said cylinders, so that they may be readily rotated by the operator, the arrangement of the thumb-pieces being shown in Figs. 3 and 4.

The cylinder or tumbler 34 is provided with a vertical slot 38, extending from the lower edge of said cylinder to near the upper edge thereof, where it is turned at right angles, as shown at 39 in Fig. 9. Similarly, the cylinder 35 is provided with a vertical slot 40, having a horizontal portion 41 at its upper end. The slots 38 40 of the two cylinders are movable into line with each other by the rotation of said cylinders, and they are adapted to receive the laterally-projecting lug 28, carried by the bar 17. The length of the cylinders 34 35 is such that when the bar 17 is moved downward in locking the bicycle the lug 28 will move below the lower edges of said cylinders, so that by turning said cylinders the slots 38 40 may be moved out of line with said lug 28, thereby preventing upward movement of the bar 17. It is obvious also that said bar cannot be moved upward until the slots 38 40 are moved into line with each other and into line with the lug 28, thus forming a permutation-lock for the bar 17. Figures or letters may be provided upon the thumb-pieces 36 37, or they may be otherwise marked to enable the operator to determine the point to which the cylinders must be turned to unlock the bar 17.

It is obvious that instead of using two locking-cylinders a greater number may be used.

Although my improved lock is shown as applied to a bicycle, it may be applied to many other wheeled vehicles. My invention therefore is not limited to its use in connection with bicycles.

I do not wish to limit myself to the specific details of the construction shown and described, as my invention includes the use of equivalent devices.

That which I claim as my invention, and desire to secure by Letters Patent, is—

1. In a lock for velocipedes and other wheeled vehicles, the combination with a support, of a bearing, a bar movable therein, a shoe carried by said bar and movable into engagement with one of the vehicle-wheels, a lug 28 projecting from said bar, and cylinders 34 35 having slots 38 40 respectively, said lug being adapted to move in said slots, substantially as described.

2. In a lock for velocipedes and other vehicles, the combination with a support, of a bar 17, a shoe, a sleeve 16, a pin moving in slots in said sleeve, a spring 20, and means for locking said shoe in operative position, substantially as described.

3. In a lock for velocipedes and other vehicles, the combination with a support, of a bar 17, a shoe carried thereby movable into engagement with one of the wheels of the vehicle, a roller 30 supported by said bar, and a cam-lever 33 bearing against said roller whereby the bar 17 may be depressed by operating said lever, substantially as described.

4. In a bicycle-lock, the combination with a casting, and locking mechanism arranged therein, of arms 11 12 adapted to be secured to the fork of the bicycle, the upper arm 12 being bifurcated, substantially as described.

CARL G. MORGNER.

Witnesses:
 JOHN L. JACKSON,
 ALBERT H. ADAMS.